United States Patent
Liu et al.

(10) Patent No.: US 6,524,491 B1
(45) Date of Patent: Feb. 25, 2003

(54) DOUBLE PLATE-UP PROCESS FOR FABRICATION OF COMPOSITE MAGNETORESISTIVE SHARED POLES

(75) Inventors: Chun Liu, Fremont, CA (US); Cherng-Chyi Han, San Jose, CA (US); Kochan Ju, Fremont, CA (US); Po-Kang Wang, San Jose, CA (US); Jei-Wei Chang, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/298,935

(22) Filed: Apr. 26, 1999

(51) Int. Cl.$^7$ .............................................. G11B 5/127
(52) U.S. Cl. ........................... 216/22; 216/38; 216/57; 216/66; 29/603.01; 29/603.07; 360/317
(58) Field of Search .............................. 216/22, 38, 49, 216/57, 66, 72, 75; 29/603.01, 603.07, 603.16, 603.18; 360/328, 119, 121, 122, 317

(56) References Cited

U.S. PATENT DOCUMENTS

| | | | |
|---|---|---|---|
| 5,267,112 A | * 11/1993 | Batra et al. ................. 360/119 |
| 5,435,053 A | 7/1995 | Krounbi et al. ............... 29/603 |
| 5,606,478 A | 2/1997 | Chen et al. .................. 360/126 |
| 5,639,509 A | 6/1997 | Schemmel ................... 427/130 |
| 5,722,157 A | * 3/1998 | Shouji et al. ............. 29/603.14 |
| 5,750,275 A | 5/1998 | Katz et al. .............. 428/694 R |
| 6,018,862 A | * 2/2000 | Stageberg et al. ........ 29/603.14 |
| 6,097,578 A | * 8/2000 | Pokhil ........................ 360/319 |
| 6,130,809 A | * 10/2000 | Santini ....................... 360/317 |
| 6,131,271 A | * 10/2000 | Fontana, Jr. et al. ..... 29/603.14 |
| 6,188,544 B1 | * 2/2001 | Mino .......................... 360/126 |
| 6,191,918 B1 | * 2/2001 | Clarke et al. ............... 360/126 |
| 6,278,590 B1 | * 8/2001 | Gill et al. ................... 360/317 |

OTHER PUBLICATIONS

Laminated Seed Layers for Plated Thin Film Heads and Structures. IBM Technical Disclosure Bulletin, Jun. 1992, vol. 35 No. 1B pp. 457–459. TDB–ACC–No: NB9206457.*
Van Nostrand's Scientific Encyclopedia, sixth edition, 1983, Considine, editor. p. 2559 Shielding.*

* cited by examiner

Primary Examiner—Gregory Mills
Assistant Examiner—Allan Olsen
(74) Attorney, Agent, or Firm—George O. Saile; Stephen B. Ackerman; Graham S. Jones

(57) ABSTRACT

A method of manufacturing a magnetic recording head includes the following steps. Form a low magnetic moment, first magnetic shield layer over a substrate. Form a read gap layer with a magnetoresistive head over the first shield layer. Form a seed layer over the read gap layer covered with a frame mask with a width "F". Form a PLM second shield layer over the seed layer and planarize the shield layer. Form a non-magnetic copper or dielectric spacer layer over the PLM second shield layer. Form a first HMM, lower pole layer over the non-magnetic spacer layer. Cover the first HMM, lower pole layer with a write gap layer. Form an write head mask composed of two parallel rows of resist with an outer width "W" over the seed layer. Between the two rows of resist of the write head mask is a trench having a width "N". Then form an HMM, upper pole layer over the write gap layer aside from the write head mask. Outside of the write head mask remove the upper pole layer and shape the lower pole layer by an IBE process.

13 Claims, 5 Drawing Sheets

DOUBLE PLATE-UP PROCESS FOR FABRICATION OF COMPOSITE MAGNETORESISTIVE SHARED POLES

BACKGROUND OF THE INVENTION

1. Field of the Invention

This invention relates to thin film heads and more particularly to magnetoresistive (MR) thin film heads.

2. Description of Related Art

U.S. Pat. No. 5,435,053 of Krounbi et al. for "Simplified Method of Making Merged MR Head" shows a method for making a planarized merged pole.

U.S. Pat. No. 5,639,509 of Schemmel for "Process for Forming a Flux Enhanced Magnetic Data Transducer" shows a two layered bottom pole formed by a top shield composed of an NiFe layer 42 covered with a pole layer 48 for an inductive read head formed of a thin flux enhancement layer with relatively High Magnetic Moment (HMM). As to the NiFe layer 42, ratio of Ni to Fe in the composition is unspecified. This is a flux enhanced data transducer and method for producing the same in conjunction with shared shields on MR read heads. Between 500 Å–2500 Å of a HMM material 48 is added to the upper surface of the shared shield 42, to form the bottom pole of an inductive write head 40 pole, prior to a magnetic flux containment ion milling operation utilizing the upper pole as a mask. The HMM flux enhancement layer 42, which may be composed of FeN, CoNiFe or other higher magnetic moment materials, is deposited prior to the formation of the dielectric gap layer. The flux enhancement layer may then be selectively removed substantially surrounding the upper pole by means of a relatively brief ion milling process in which only on the order of 1.0 kÅ of the layer needs to be removed and during which only an insignificant amount of the material removed might be re-deposited on the sides of the upper pole.

U.S. Pat. No. 5,750,275 of Katz et al. for "Thin Film Heads with Insulated Laminations for Improved High Frequency Performance" shows a laminated magnetic pole member using an alumina ($Al_2O_3$) insulating layer.

U.S. Pat. No. 5,606,478 of Chen et al. for "$Ni_{45}Fe_{55}$ Metal-in-Gap Thin Film Magnetic Head" shows a composite structure with an MR magnetic read head with an MR stripe and an inductive magnetic read head. Between the MR head and the inductive head is a pole piece composed of a combination of High Magnetic Moment (HMM) and PERMALLOY-Like Material (PLM) with Low Magnetic Moment (LMM) laminated together. The MR head includes two magnetic shields with the lower one formed on the substrate. A shared shield/pole includes the upper magnetic shield of the MR head formed in a composite structure with the lower pole of the inductive magnetic read head. The shared PLM shield/HMM pole which is formed of plated thick layer of $Ni_{80}Fe_{20}$ which is a PLM material/with a plated thin layer of $Ni_{45}Fe_{55}$ which is an HMM material.

SUMMARY OF THE INVENTION

With the continuous trend in the magnetic recording industry towards increasing the track density of magnetic recording, it becomes increasingly important to reduce edge erasure from adjacent track writing. Edge erasure, resulting from writing fringe, can decrease the written track width and can reduce drive yield by degrading off-track capacity and/or unwanted overwriting of adjacent tracks when writing. The writing fringe field often comes from a dimensional inconsistency and a mismatch of materials near the area where the flux is crowded, i.e. the gap area, of write heads. Recording on high-coercivity media especially requires magnetic recording heads made of High Moment Material (HMM) for write poles and PERMALLOY Material (PLM) for MR shields.

Magnetic poles made of materials with a saturation magnetization higher than that of PERMALLOY are desirable for improving the writability of magnetic recording heads.

We have found that there is a need for merged MR recording heads with both High saturation Moment Material (HMM) and PERMALLOY for a shared pole. The HMM material is suitable for recording on high-coercivity media. PERMALLOY or PERMALLOY-Like Material (PLM) can function as a good sensor shield.

Materials with a saturation magnetization higher than that of PERMALLOY ($Ni_{79}Fe_{21}$ alloy) are desired for improving the writability of recording heads. A considerable need has led towards the direction of producing magnetoresistive (MR) merged recording heads with High saturation Moment ($4\pi M_s$) Material (HMM) and PERMALLOY.

PERMALLOY or PERMALLOY-like materials (PLMs) can function as a good sensor shields. A copending commonly assigned application Ser. No. 09/283,840 filed on Apr. 1, 1999, now U.S. Pat. No. 6,393,692 entitled "Method of Manufacture of a Composite Shared Pole Design for MR Merged Heads and Device Manufactured Thereby" has a shared pole design which minimizes the effects of dimension change and material mismatch on side writing. The subject matter thereof is Incorporated herein by reference.

Due to the improvement of head performance, we find that planarization of a shared pole is useful for flattening topography resulting from MR and conductors.

When using a metal planarization process, it is difficult to obtain good uniformity across the wafer. The variation in thickness can be as large as ±0.7 $\mu$m which results in large variations in the thickness of the top, HMM layer if the planarization process is to be applied after both the PML layer and the HMM layer were formed. The thickness of the HMM layer is critical for eliminating saturation, which can cause a large writing fringe field.

GLOSSARY

| | |
|---|---|
| Edge erasure | Erasure of the edge of an adjacent track when writing on a track |
| Writing fringe | Writing on the fringe of a track from an adjacent |
| Overwrite | The process of writing on a disk track to erase previously written information while simultaneously writing new data. |
| Side writing | Writing on the side of a track which adversely affects data recorded on an adjacent track. |
| HMM | High Moment Material of metals and alloys having high saturation moments or saturation magnetization ($4\pi M_s$) characteristics such as $Ni_{45}Fe_{55}$, $Ni_{45}Fe_{55}Sn$, CoNiFe, CoFeCu, $Ni_{45}Fe_{55}Cr$, and $Ni_{45}Fe_{55}Mo$. |
| PERMALLOY | A nickel rich alloy with iron $Ni_{79}Fe_{19}$ with a ratio just below 5:1 Ni atoms to Fe atoms. |
| PERMALLOY Like Material | PLM |
| PLM | PERMALLOY Like Material consists of all metals and alloys having soft-magnetic properties (including PERMALLOY) such as PERMALLOY ($Ni_{79}Fe_{19}$), NiFeCr, NiFeMo, NiFeW, NiFePd NiFeCu, NiFeCo in which the ratio of nickel atoms to iron atoms |

GLOSSARY-continued

| | |
|---|---|
| | is about 5:1 with fewer high magnetic moment iron atoms. |
| ABS | Air Bearing Surface - pole tips are separated by an air gap at an ABS. |
| IBE | Ion Beam Etching |

A method of manufacturing a magnetic recording head includes the following steps. Form a low magnetic moment, first magnetic shield layer (S1) over a substrate.

Form a read gap layer (RG) with a magnetoresistive head over the first shield layer (Si). Then form a seed layer (SL) over the read gap layer (RG). Next, form a frame mask (PR) with width (F) over the seed layer (SL). Form a low magnetic moment, second magnetic shield layer (S2A) over the seed layer (SL), which is over the read gap layer (RG). Planarize the low magnetic moment, second magnetic shield layer (S2A). Preferably, form a non-magnetic spacer metal or metal alloy layer (SP), preferably composed of copper, over the second magnetic shield layer. Then form a lower, first high magnetic moment, lower pole layer (S2B) over the second magnetic shield layer (S2A), preferably over the non-magnetic spacer metal or metal alloy layer (SP).

Then, form a second mask covering a portion of the structure defined by the frame mask. Then, outside of the second frame mask, remove the portions the upper, second high magnetic moment, pole (UP), the write gap layer (WG), the first high magnetic moment, lower pole layer (S2B), the second magnetic shield layer (S2A), and the seed layer (SL).

FIGS. 1A–1I shows successive steps in a process of manufacturing a device shown in FIG. 2 in accordance with the method of this invention. FIG. 1I shows a section taken along line 1—1 in FIG. 2. FIGS. 1A–1H show a series of sections taken generally along line 1—1 of FIG. 2 in various earlier stages of the process of this invention leading to the device shown in FIGS. 1I and 2.

FIG. 2 shows a fragmentary sectional view of a merged MR head with a PLM shield layer laminated with an HMM lower pole layer in accordance with this invention showing an embodiment of this invention.

Then employ etching, preferably ion beam etching (IBE), to narrow the write gap layer (WG) to the width "N" of the second high magnetic moment, upper pole (UP). Also employ etching (preferably IBE) to pattern the first high magnetic moment, lower pole layer to magnetic pole width "N" in part and flaring the remainder of the high magnetic moment, lower pole layer (S2B) towards the width "W", where "W" is substantially greater than "N", but "W" is substantially less than the width of the second magnetic shield layer (S2A).

As a result, the upper, second high magnetic moment, upper pole layer (UP) has a narrow width "N", the high magnetic moment, lower pole layer (S2B) has a width "N" underneath the write gap, and the high magnetic moment, lower pole layer (S2B) also has a width "W" over the second magnetic shield layer (S2A). Narrow the upper, second pole layer (UP) and the write gap layer (WG) to upper magnetic pole width "N" where width "W" is substantially greater than width "N", but substantially less than the width of the second shield, and pattern the first high magnetic moment, lower pole layer (S2B) to magnetic pole width "N" in part and flaring the remainder of the first high magnetic moment, lower pole layer (S2B) towards the width "W" of the second magnetic shield layer (S2A). This structure is fashioned by using the upper pole (UP) as a mask to trim the high magnetic moment, lower pole layer (S2B) (below upper pole (UP)) of the shared lower pole (LP) so that the high magnetic moment, lower pole layer (S2B) has the same dimension "N" as the upper pole (UP) and its bottom part is wider with a width "W" towards the PLM shield layer (S2A).

Preferably, the low magnetic moment, second magnetic shield layer (S2A) over the read gap layer is formed of a material selected from the group consisting of metals and alloys having soft-magnetic properties including PERMALLOY, NiFeCr, NiFeMo, NiFeW, NiFePd, NiFeCu, ard NiFeCo. Both the lower HMM pole layer (S2B) and the upper HMM pole layer (UP) are formed of a material selected from the group consisting of $Ni_{45}Fe_{55}$, $Ni_{45}Fe_{55}Sn$, CoNiFe, CoFeCu, $Ni_{45}Fe_{55}Cr$, and $Ni_{45}Fe_{55}Mo$.

Preferably, sputter a PLM nickel-iron seed layer over the read gap layer prior to plating the low magnetic moment, second magnetic shield layer.

The trimming time can be defined by the thickness of the the first HMM lower pole layer (S2B) and its slope (i.e. from width W to width N over the thickness of the first HMM lower pole layer (S2B)).

This process makes it possible to perform the steps of plating/planarizing/plating/plating which allows us to have planarization variation remain the first plated layer (S2A) of the shared shield and keep the lower pole PLM (S2A) and first HMM lower pole layer (S2B) uniform.

A layered structure such as (PLM/non-magnetic spacer/ HMM) can use a process sequence of processing steps of plating/planarization/plating/plating.

A non-magnetic passivation layer such as silicon oxide or ferric hydroxide can be used with processing steps of plating/planarization/passivation/plating.

This shared pole design minimizes the effects of dimension change and material mismatch at the write gap on side writing.

BRIEF DESCRIPTION OF THE DRAWINGS

The foregoing and other aspects and advantages of this invention are explained and described below with reference to the accompanying drawings, in which:

Then, form a second mask covering a portion of the structure defined by the frame mask. Then, outside of the second frame mask, remove the portions the upper, second high magnetic moment, pole (UP), the write gap layer (WG), the first high magnetic moment, lower pole layer (S2B), the second magnetic shield layer (S2A), and the seed layer (SL).

FIG. 1I shows a section taken along line 1—1 in FIG. 2. FIGS. 1A–1H show a series of sections taken generally along line 1—1 of FIG. 2 in various earlier stages of the process of this invention leading to the device shown in FIGS. 1I and 2.

DESCRIPTION OF THE PREFERRED EMBODIMENT

Figure 1A:
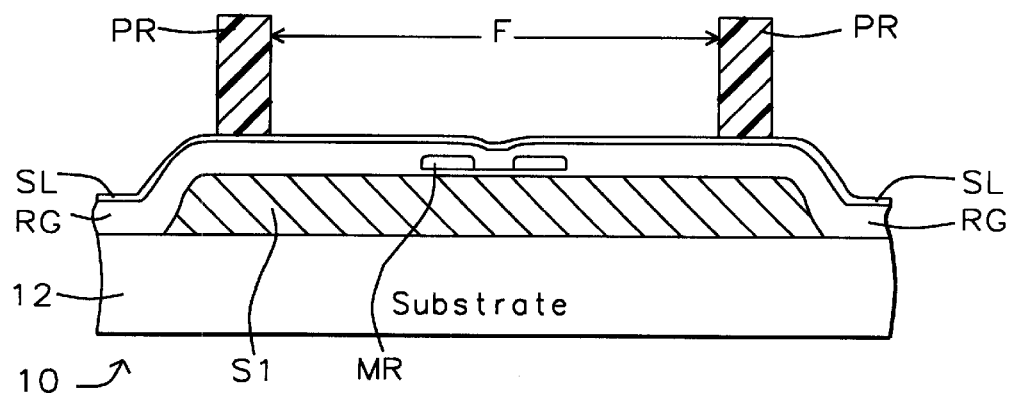
FIGS. 1A–1I show successive steps in a process of manufacturing a device shown in FIG. 2 in accordance with the method of this invention.
Figure 1B:
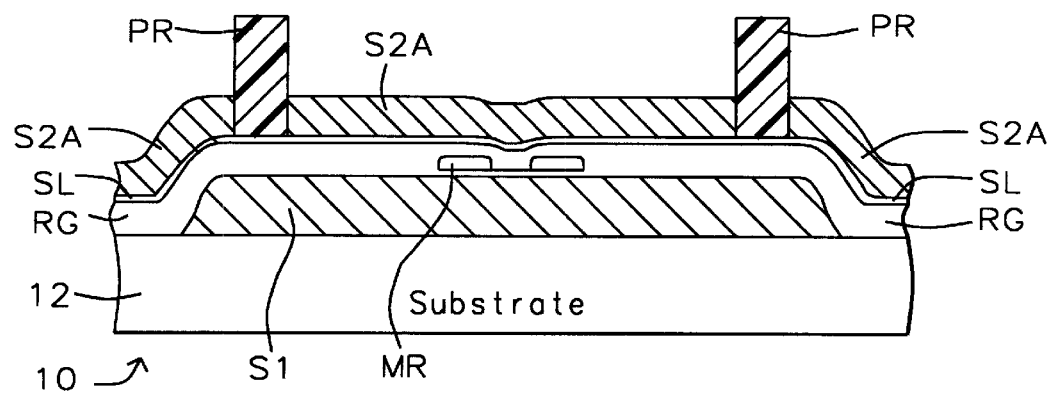
Figure 1C:
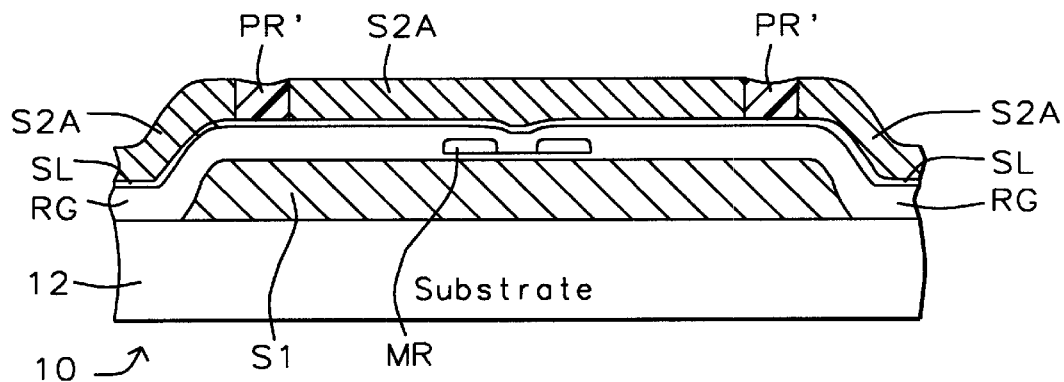
Figure 1D:
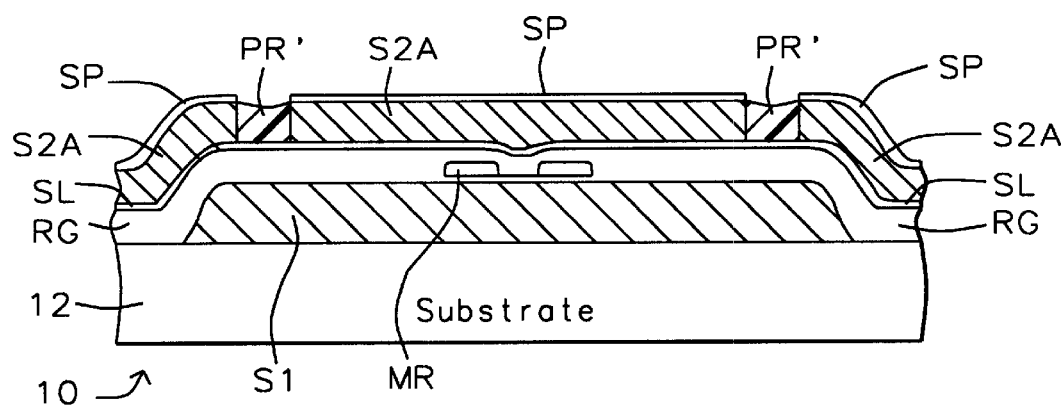
Figure 1E:
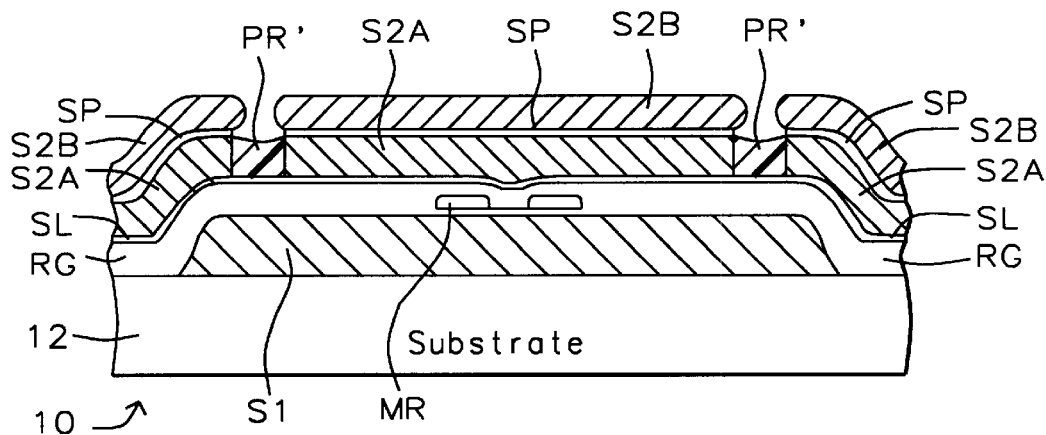
Figure 1F:
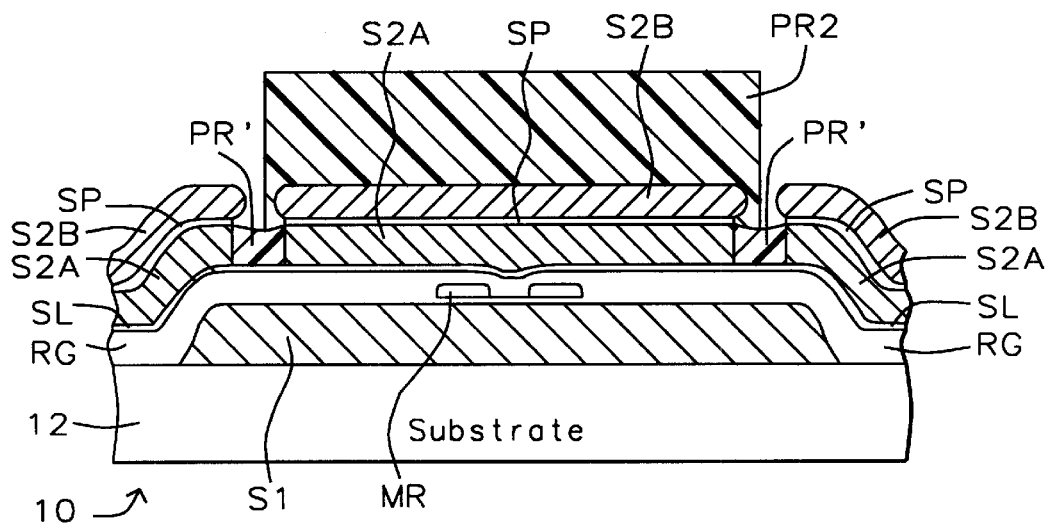
Figure 1G:
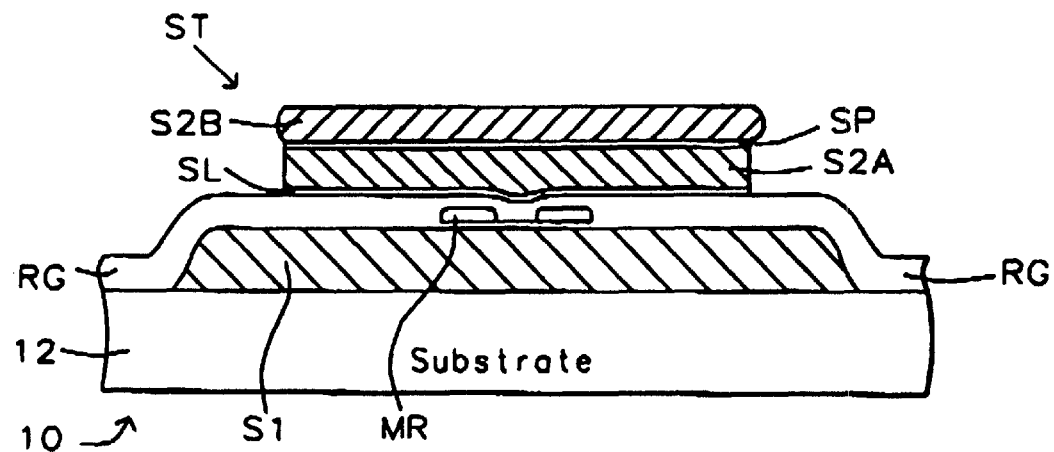
Figure 1H:
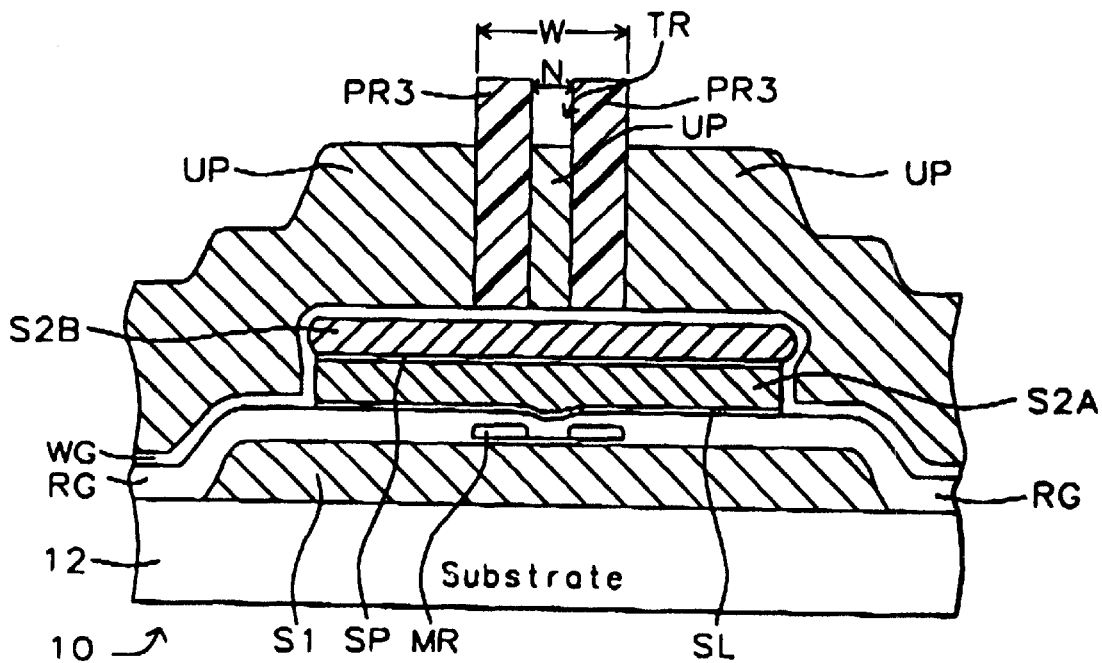
Figure 1I:
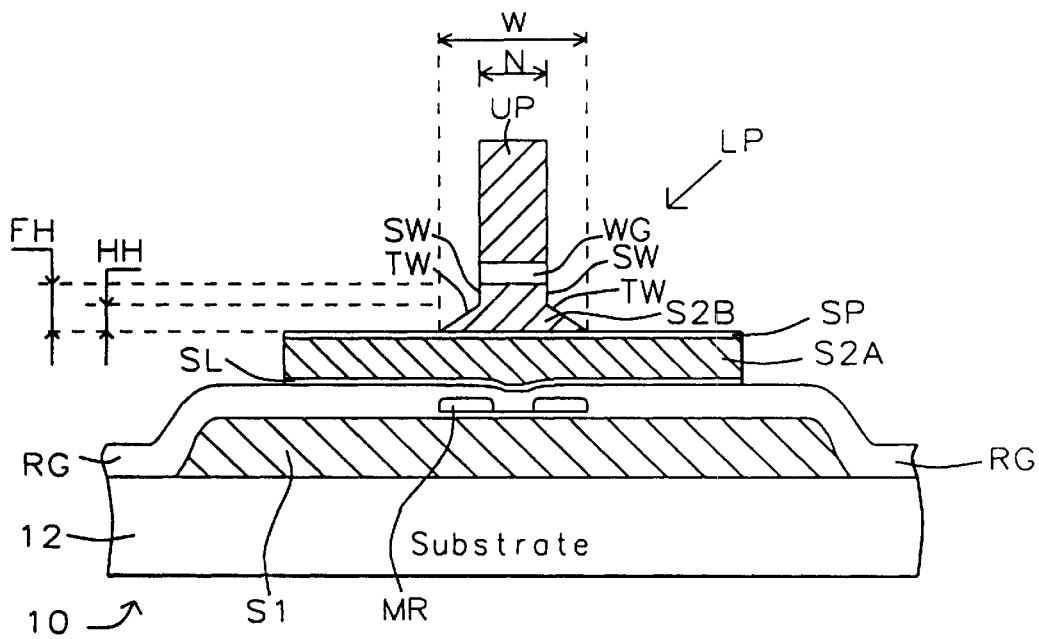
Figure 2:
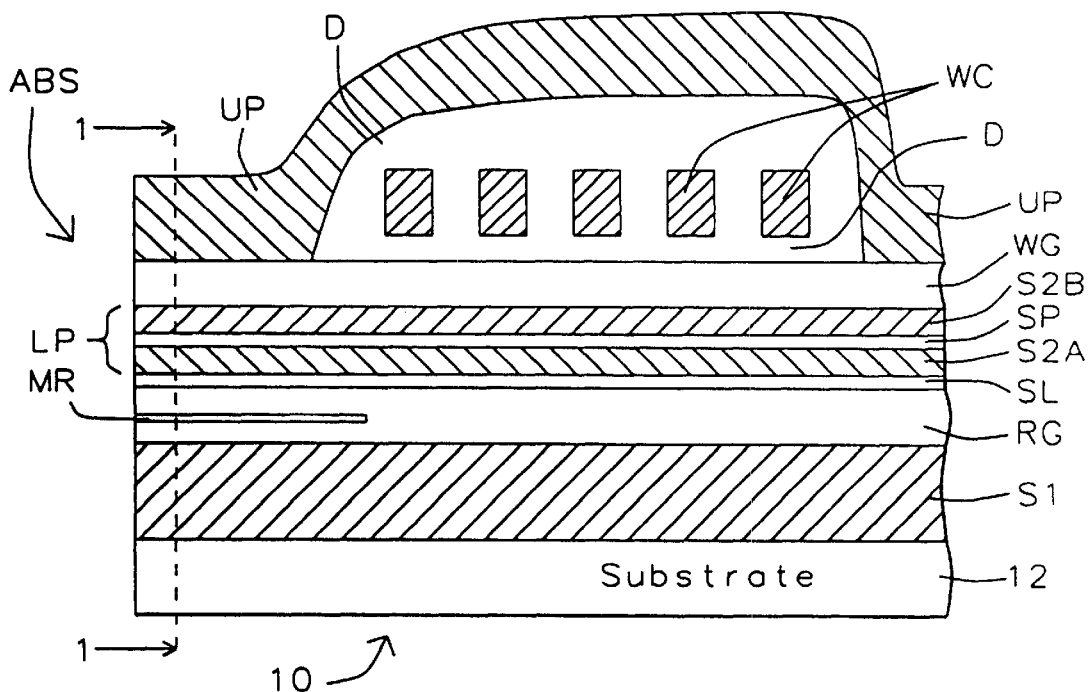
FIG. 2 shows a fragmentary sectional view of a merged MR head with a PLM shield layer laminated with an HMM lower pole layer in accordance with this invention showing an embodiment of this invention.

FIG. 2 shows a fragmentary, schematic, sectional view of a device 10 showing a product made in accordance with the method of this invention. FIG. 1 is a sectional, illustrative view of the device 10 of FIG. 2 with a view taken along line 1—1 in FIG. 2. A merged MR head 10 is provided on a conventional magnetic recording head substrate 12. The surface of substrate 12 carries a low magnetic moment, first magnetic shield layer S1.

On the surface of shield layer Si is formed a read gap RG composed of a non-magnetic dielectric material. The read gap layer RG is formed with a magnetoresistive sensor MR sandwiched within the read gap layers RG, as will be well understood by those skilled in the art.

Above read gap layer RG, a sputtered seed layer SL is formed.

A laminated, shared, lower pole LP formed on seed layer SL. The laminated lower pole LP comprises a PLM shield/ lower pole layer S2A laminated with a spacer layer SP and a High Magnetic Moment (HMM), lower pole layer S2B. The shared lower pole is plated comprising laminated layers S2A/SP/S2B. Thus, the shared lower pole combination is formed by a lower pole PLM layer S2A plated on seed layer SL, spacer layer plated on layer S2A and an upper HMM layer S2B plated on the spacer layer SP. Thus, lower pole PLM shield/lower pole layer S2A of the lower pole is formed on the top surface of seed layer SL which is formed on the top surface of the read gap layers RG. The upper HMM layer of lower pole LP which comprises the first High Magnetic Moment (HMM) layer S2B is formed above layer S2A. Moreover, High Magnetic Moment (HMM) layer S2B is one of a pair of HMM layers which comprise the material of the poles LP and UP adjacent to a write gap WG layer which is formed on the top surface of the first High Magnetic Moment (HMM) layer S2B.

The write gap layer WG is also composed of a non-magnetic material, which is formed over the lower pole HMM layer S2B portion of the lower pole LP as seen in FIG. 1I.

If required, the lower pole PLM layer S2A is separated from the lower pole HMM layer S2B by a non-magnetic spacer layer SP. The structure of FIG. 2 shows the write coils WC in a dielectric layer D above the write gap layer WG and below the second HMM, upper pole layer UP. The remaining layers were described elsewhere herein. In FIG. 2, the air bearing surface ABS is shown on the left end of the device 10. The right end of the device 10 is broken away for convenience of illustration.

The second HMM, upper pole layer UP comprises a write head pole composed of HMM material formed on the surface of the write head gap layer WG. Thus the write head gap layer WG is located between first HMM layer S2B of the lower pole and the upper pole UP which comprises a second high magnetic moment, upper pole UP of the write head.

The two HMM layers (the HMM layer S2B of the lower pole LP and second HMM, upper pole layer UP of the upper pole UP) include a pair of confronting layers which make it possible for the write head to record on high-coercivity magnetic recording media. At the same time, the second magnetic shield, which is the PLM layer S2A of the shared lower pole LP, functions as a good MR sensor shield for the magneto-resistive stripe MR.

As stated above, the top, write head pole UP comprises an HMM layer with a narrow width "N". The shared pole LP (FIG. 2 and FIG. 1I) is made of a structure of the HMM lower pole layer S2B on top of the PLM lower pole layer S2A. The shaped, shared lower pole LP (layers S2A/LP/S2B) is patterned by a process of Ion Beam Etching (IBE) which improves the dimensional consistency between upper pole UP and the shared pole LP and to eliminate the mismatch of magnetic characteristics. Otherwise, a possible mismatch would have existed between the plated PLM layer and the HMM upper pole layer UP had the HMM layer S2B not been present.

As also stated above, there is a key structural modification comprising separation of HMM lower pole layer S2B from the first PLM lower pole layer S2A by a non-magnetic spacer layer SP. If a spacer layer SP is provided, as in FIG. 2, before plating HMM lower pole layer S2B, spacer layer SP can be plated on top of a metal area on the surface of PLM metal, lower pole layer S2A. In the lower pole LP, the non-magnetic spacer layer SP allows the HMM/PLM layers S2B/S2A to perform their individual functions freely with reduced magnetic, interaction, while remaining in intimate physical proximity (on either surface of layer SP) separated by layer SP by a spacing on the order of only about 75 Å–125 Å or preferably about 100 Å.

In FIG. 1I, the HMM lower pole layer S2B has vertical, trimmed sidewalls SW extending from the top thereof to about half-way down towards layer S2A. Then, referring again to FIG. 1I, the walls flair out from a width "N" laterally forming tapered walls TW with a width "W" at the base where walls TW reach the top surface of layer S2A or spacer layer SP, if layer SP is present. Walls TW are sloped at an acute angle of between about 10° and about 35° from the horizontal angle; and the first HMM layer S2B is of equal width to top HMM layer UP at the top thereof. Width "N" is less than width "W" which in turn is far less than width "F".

Still referring to FIG. 1I, layer S2B has a full height FH. The upper portion of layer S2B has a narrow width N, but the lower portion has a width varying from broad width W at the bottom to narrow width N at the top of height HH. Height HH is about half the height FH. Thus layer S2B has a substantial width "W" at the bottom of tapered walls TW where it is proximate to contact with PLM layer S2A whereas it is narrow with width "N" proximate to the narrow pole UP. The dimensions shown in FIG. 1I and FIG. 2 are substantially equal and the dimension markings are separated for clarity of illustration with FIG. 1I showing the heights of the portions of lower pole layer S2B.

The two examples of embodiments of this invention are layered structures which have been investigated by applicants and which are referred to hereinafter as structure A and structure B.

Structure A

In structure A, the lower pole LP (S2A/SP/S2B) of FIG. 1I and FIG. 2 includes the stacked layers as follows:

PLM (S2A)     SP     HMM (S2A)
1 μm Ni81Fe19/100 Å Cu/1 μm Ni45Fe55Sn0.3)

Structure A was made with a 100 Å thick copper (Cu) spacer layer SP between the PLM layer S2A and the HMM layer S2B, as shown in FIGS. 1I and 2.

Structure B

In structure B, the lower pole LP of FIG. 1I and FIG. 2 includes the stacked layers as follows:

| PLM | HMM |
|---|---|
| 1 μm $Ni_{81}Fe_{19}$ | 1 μm $Ni_{45}Fe_{55}Sn_{0.3}$ |

Structure B had no spacer layer between the PLM layer S2A and the HMM layer S2B, but was otherwise identical to Structure A.

It is evident that the 100 Å thick nonmagnetic copper spacer layer SP effectively separates the magnetization of the Ni45Fe55Sn0.3 HMM layer S2B and the magnetization of the Ni81Fe19 PLM layer S2A. The magnetic separation provided by the copper spacer layer SP makes the HMM layer capable of carrying high-intensity flux without adversely disturbing the remanent state of the PLM layer S2A. This feature is used to build a shared pole in accordance with the embodiment shown in FIG. 2 of this invention.

By partially trimming the structure of head 10 with an ion-beam, the track width of write poles UP/LP is self-aligned, so unwanted side writing can be minimized further.

PROCESS

Structure

Electrodeposition

1. To build up a structure, a PERMALLOY seed-layer is deposited by sputtering. Referring to FIG. 1A, the device 10 of FIG. 2 is shown in an early stage of manufacture during which a metal seed-layer SL is sputtered onto the surface of read gap layer RG. Then a photoresist frame PR with two sides seen in FIG. 1A spaced widely apart by distance "F" is applied to the surface of seed-layer SL by a photolithographic exposure and development process to form a shared pole pattern.

2. Referring to FIG. 1B, the device 10 of FIG. 1A is shown after electrodeposition above seed-layer SL (aside from photoresist frame PR) of a second magnetic shield/lower pole layer S2A composed of PERMALLOY Like Material (PLM) with low magnetic moment. Preferably the PLM layer S2A is composed of PERMALLOY which has been frame-plated onto seed-layer SL to a thickness of about 1 μm (one micrometer) through the shared pole mask PR. The PLM, lower pole layer S2A can be composed of a material selected from the group consisting of metals and alloys having soft-magnetic properties including PERMALLOY, NiFeCr, NiFeMo, NiFeW, NiFePd, NiFeCu, and NiFeCo.

By using a sophisticated auxiliary electrode-design (J.ECS, 137,110–117, (1990)), one can achieve, a thickness variation within ±0.1 μm.

3. Referring to FIG. 1C, the device 10 of FIG. 1B is shown after planarization of PLM layer S2A with the photoresist frame PR remaining in place. The layer S2A is planarized by CMP (Chemical-Mechanical Polishing/Planarization), removing only a portion of photoresist frame PR leaving lowered photoresist frame PR'. Thus, the surface of metal layer S2A is flattened and the lowered photoresist frame PR' remains.

In a metal planarization process it is difficult to have a good uniformity across the wafer. Variations of layer S2B thickness can be as large as ±0.7 μm, which could result in a large thickness variation of upper HMM layer S2B.

The precision of the thickness of upper HMM layer S2B, which is shown in FIGS. 1I and 2, is critical for eliminating saturation, which can cause a large writing fringe field. When the metal layer surface of PLM layer S2A is flattened the flattened resist frame PR' remains at this stage of the process.

4. Referring to FIG. 1D the device 10 of FIG. 1C is shown after the step was taken at the end of the CMP step of planarizing layer S2A of switching to plating a non-magnetic thin copper spacer layer SP to a thickness of about 100 Å. Spacer SP is preferably composed of copper or alternatively is composed of a dielectric layer.

5. Referring to FIG. 1E the device 10 of FIG. 1D is shown after the step was taken at the end of plating of copper spacer layer SP of switching to forming HMM lower pole layer S2B by plating with the photoresist PR' remaining in place.

The lower HMM pole layer (S2B) is preferably formed of a material selected from the group consisting of $Ni_{45}Fe_{55}$, $Ni_{45}Fe_{55}Sn$, CoNiFe, CoFeCu, $Ni_{45}Fe_{55}Cr$, and $Ni_{45}Fe_{55}Mo$.

Because, the top HMM layer S2B is plated after the surface was polished, the variation of HMM layer thickness of layer UP can be controlled only by plating process parameters.

6. Referring to FIG. 1F the device 10 of FIG. 1E is shown after forming a mask PR2 over the central portion of the device between the lines of flattened photo-resist frame PR' to protect layer S2B within the two sections of the frame PR'. The patterned photoresist layer PR2 was applied to cover all wanted portions of the shared poles layers S2B/SP/S2A/SL and field areas during a chemical etching process to remove undesired materials associated with the lower pole layers S2B/S2A and spacer SP, etc.

7. Referring to FIG. 1G the device 10 of FIG. 1G is shown after stripping the portions of PMM layer S2B, spacer SP and PLM layer S2A on the periphery of device 10 to the right and left of the mask PR2 leaving the stack ST of layers SL/S2A/SP/S2B seen in FIG. 1G centered over magnetoresistive element MR.

The frame photoresist PR' has been removed and the seed layer SL has also been removed where exposed by the removal of layers thereabove including the portions of PMM layer S2B, spacer SP and PLM layer S2A on the periphery of device 10 to the right and left of the mask PR2.

8. Referring to FIG. 1H the device 10 of FIG. 1G is shown after forming the write gap layer WG over the top of layer S2B. The material of the write gap layer WG is a conventional non-magnetic material employed in magnetic recording heads, as is well understood by those skilled in the art. The write gap layer WG can be applied by plating or other conventional deposition techniques.

9. Referring again to FIG. 1H, the next step was to form photoresist mask PR3 over the write gap layer WG. Mask PR3 includes a pair of rows of photoresist PR3 spaced apart by a space "N" with a substantial thickness in excess of that of the second HMM, upper pole layer UP which is to be formed next. The two parallel rows of resist PR3 have an outer width "W" with a trench TR therebetween having a width of "N".

10. Referring still to FIG. 1H, the following step it to form second HMM, upper pole layer UP in a blanket deposition over the non-magnetic write gap layer WG, preferably by plating aside from the two stacks of photoresist PR3. The second HMM, upper pole layer UP is also deposited by a conventional technique as will be well understood by those skilled in the art. The second HMM, upper pole layer UP, like layer S2B, is preferably formed of a material selected from the group consisting of Ni45Fe55, Ni45Fe55Sn, CoNiFe, CoFeCu, Ni45Fe55Cr, and Ni45Fe55Mo. Excess thickness of upper pole layer UP compensates for Ion-Beam Etching (IBE) which is used in step 13 below to trim the HMM layers of device 10.

11. Referring again to FIG. 1I the device 10 of FIG. 1H is shown after forming the coil (not shown), after the removal of undesired materials associated with the upper pole and write gap process by chemical etching using a mask not shown.

12. Referring again to FIG. 1I the device 10 of FIG. 1H is shown after masking with a mask not shown followed by etching away the periphery of the layers UP, WG and, S2B.

13. Referring once more to FIG. 1I the device 10 is shown after the upper poles UP have been used as a trimming mask and the IBE (Ion Beam Etching) process has been used to trim the shared pole LP. The trimming time will be defined by the thickness of the HMM layer and the slope of the layer S2B (i.e. W–N thickness). The ion beam etching is modified in duration and incident angle as a function of edge of upper pole UP of width "N" to the edge of the thickness of first HMM layer S2B and the slope of the HMM layer S2B.

By varying the incident angle of the ion beam and by rotating the wafer during ion beam etching, the effectiveness of the upper pole UP as an IBE mask is altered, and the extent of the etching of HMM layer S2B etching depends upon positrons relative to the upper pole UP. By carefully choosing the duration and angle of IBE, a straight and then a tapered profile of HMM layer S2B can be achieved at the ABS (Air Bearing Surface).

By partially ion-beam trimming, the inconsistency of the geometry at write gap layer WG can be eliminated. The side writing of the write poles LP/UP can be decreased further. This design suggests that both material mismatch and track width inconsistency be pushed to the middle layer (between HMM/PLM S2B/SP/S2A) of the shared pole LP.

Structure B

The structure B is produced by the process employed to produce the structure shown with the exception that step 4 of plating a non-magnetic thin copper spacer layer SP was omitted.

Preferably, sputter a PLM nickel-iron seed layer over the read gap layer prior to plating the low magnetic moment, second magnetic shield layer.

This process makes it possible when forming the lower pole LP to plate (S2A)/planarize/plate(S2B) which allows us to have planarization variation remain for the first plated lower pole PLM layer S2A and keep the second lower pole HMM layer S2B uniform.

Alternatives

A layered structure such as (PLM/non-magnetic spacer/HMM) can use a process sequence of processing steps of plating/planarization/plating/plating.

A non-magnetic passivation layer such as silicon oxide or ferric hydroxide can be used with processing steps of plating/planarization/passivation/plating.

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly, all such changes come within the purview of the present invention and the invention encompasses the subject matter of the claims which follow.

Having thus described the invention, what is claimed as new and desirable to be secured By Letters Patent is as follows:

1. A method of manufacturing a merged read/write magnetic recording head comprising:

forming a low magnetic moment, first magnetic shield layer (SI) over a substrate (12), forming a read gap layer (RG) with a magnetoresistive head (MR) over said first shield magnetic layer (Si), forming a shared lower pole comprising:
 a) forming a low magnetic moment, second magnetic shield layer (S2A) over said read gap layer (RG),
 b) planarizing said low magnetic moment, second magnetic shield layer (S2A),
 c) forming a nonmagnetic, metal spacer layer (SP) over said low magnetic moment, second magnetic shield layer (S2A), and below a high magnetic moment, lower pole layer (S2B), and
 d) forming said high magnetic moment, lower pole layer (S2B) over said spacer layer (SP), forming a write gap layer (WG) over said high magnetic moment, lower pole layer (S2B) of said shared lower pole, and forming an upper pole layer (UP) composed of a high magnetic moment material over said write gap layer (WG).

2. A method in accordance with claim 1 wherein the steps are performed comprising:

said upper pole layer (UP) having a narrow width "N", said high magnetic moment, lower pole layer (S2B) having a width "W" over said second magnetic shield layer (S2A), where width "W" is greater than width "N" with the walls sloped at an acute angle between about 10° and about 35° from the horizontal angle, narrowing said write gap layer (WG) to width "N", narrowing a portion of said high magnetic moment, lower pole layer (S2B) to width "N" in part and flaring the remainder of said first high magnetic moment, lower pole layer (S2B) towards said width "W".

3. A method in accordance with claim 1 wherein the steps are performed comprising:

said upper pole layer (UP) having a narrow width "N", said high magnetic moment, lower pole layer (S2B) having a width "W" immediately over said low magnetic moment, second magnetic shield layer (S2A), where width "W" is greater than width "N", using said upper pole layer (UP) as a mask to trim said high magnetic moment, lower pole layer (S2B) of said shared pole so said high magnetic moment, lower pole layer (S2B) has at its top part the width "N" and said high magnetic moment, lower pole layer (S2B) has at its bottom part the width "W".

4. A method in accordance with claim 1 wherein the steps are performed comprising:

forming said nonmagnetic spacer layer (SP) composed of copper over said low magnetic moment, second magnetic shield layer (S2A), and below said high magnetic moment, lower pole layer (S2B).

5. A method in accordance with claim 1 wherein the steps are performed comprising:

said low magnetic moment, second magnetic shield layer (S2A) over said read gap layer (RG) is formed of a material having soft-magnetic properties selected from the group consisting of NiFe, NiFeCr, NiFeMo, NiFeW, NiFePd, NiFeCu, and NiFeCo, and said high magnetic moment, lower pole layer (S2B) is formed of a material selected from the group of metals and alloys having high saturation magnetization consisting of Ni45Fe55, Ni45Fe55Sn, CoNiFe, CoFeCu, Ni45Fe55Cr, and Ni45Fe55Mo.

6. A method in accordance with claim 1 wherein the steps are performed comprising:

forming a PLM nickel-iron seed layer (SL) over said read gap layer (RG) prior to plating said low magnetic moment, second magnetic shield layer (S2A).

7. A method in accordance with claim 1 wherein the steps are performed comprising:

sputtering a PLM nickel-iron seed layer (SL) over said read gap layer (RG) prior to plating said low magnetic moment, second magnetic shield layer (S2A), said low magnetic moment, second magnetic shield layer (S2A) over said read gap layer (RG) is formed of a materials having soft-magnetic properties selected from the group consisting of NiFe, NiFeCr, NiFeMo, NiFeW, NiFePd, NiFeCu, and NiFeCo, and said high magnetic moment, lower pole layer (S2B) is formed of a material selected from the group of materials having high saturation magnetization consisting of Ni45Fe55, Ni45Fe55Sn, CoNiFe, CoFeCu, Ni45Fe55Cr, and Ni45Fe55Mo.

8. A method in accordance with claim 1 wherein the steps are performed comprising:

said high magnetic moment, upper pole layer having a narrow width "N", said high magnetic moment, lower pole layer (S2B) having a width "W" immediately over said low magnetic moment, second magnetic shield layer (S2A), employing ion beam etching to narrow said lower pole layer (S2B) and said write gap layer (WG) to upper magnetic pole width "N" where width "W" is greater than "N" with the walls sloped at an acute angle between about 10° and about 35° from the horizontal angle, and employing ion beam etching to pattern said high magnetic moment, lower pole layer (S2B) to width "N" in part and flaring the remainder of said high magnetic moment, lower pole layer (S2B) to said width "W" proximate to said low magnetic moment, second magnetic shield layer (S2A).

9. A method in accordance with claim 1 wherein the steps are performed comprising:

sputtering a PLM nickel-iron seed layer (SL) over said read gap layer (RG) prior to plating said low magnetic moment, second magnetic shield layer (S2A), said upper pole layer (UP) having a narrow width "N", said high magnetic moment, lower pole layer (S2B) having a width "W" over said low magnetic moment, second magnetic shield layer (S2A), where width "W" is greater than width "N", employing ion beam etching to narrow and said write gap layer to width "N", and employing said ion beam etching to pattern said high magnetic moment, lower pole layer (S2B) to width "N" in part and flaring the remainder of said high magnetic moment, lower pole layer (S2B) to said width "W" proximate to said low magnetic moment, second magnetic shield layer (S2A).

10. A method in accordance with claim 1 wherein the steps are performed comprising:

sputtering a PLM nickel-iron seed layer (SL) over said read gap layer (RG) prior to plating said low magnetic moment, second magnetic shield layer (S2A), said upper pole layer (UP) having a narrow width "N", said high magnetic moment, lower pole layer (S2B) having a width "W" immediately over said low magnetic moment, second magnetic shield layer (S2A), where width "W" is greater than width "N" with the walls sloped at an acute angle between about 10° and about 35° from the horizontal angle, employing ion beam etching using said upper pole layer (UP) as a mask to trim said write gap layer (WG) to width "N" and to trim said high magnetic moment, lower pole layer (S2B) of said lower pole (LP) so said high magnetic moment, lower pole layer (S2B) has at its top part with a width "N" and has at its bottom part with a width "W", said low magnetic moment, second magnetic shield layer (S2A) is formed of a material having soft-magnetic properties selected from the group consisting of NiFe, NiFeCr, NiFeMo, NiFeW, NiFePd, NiFeCu, and NiFeCo, and said lower pole layer is formed of a material selected from high saturation magnetization metals and alloys in the group consisting of Ni45Fe55, Ni45Fe55Sn, CoNiFe, CoFeCu, Ni45Fe55Cr, and Ni45Fe55Mo.

11. A method of manufacturing a magnetic recording head comprising:

forming a low magnetic moment, first magnetic shield layer (Si) over a substrate (12), forming a read gap layer (RG) with a magnetoresistive head (MR) over said first shield layer (Si), forming a PLM nickel-iron seed layer (SL) over said read gap layer (RG), forming a frame mask (PR') over said seed layer (SL), forming a low magnetic moment, second magnetic shield layer (S2A) over said seed layer (SL) aside from said frame mask (PR'), then planarizing said low magnetic moment, second magnetic shield layer (S2A), next, forming a non-magnetic metal spacer layer (SP) over said second magnetic shield layer (S2A), forming a high magnetic moment, lower pole layer (S2B) over said second magnetic shield layer (S2A), outside of said frame mask (PR') performing the step of removing the portions said second magnetic shield layer (S2A), said high magnetic moment, lower pole layer (S2B), and said seed layer (SL), forming a blanket write gap layer (WG) covering said high magnetic moment, lower pole layer (S2B), and said read gap layer (RG), forming a pair of parallel write head masks (PR2) with a trench therebetween over said blanket write gap layer (WG) with an inner width "N" and an outer width "W", where width "W" is greater than width "N" with the walls sloped at an acute angle between about 10° and about 35° from the horizontal angle, forming a high magnetic moment, upper pole layer (UP) over said write gap layer (WG) aside from said write head masks, and removing said high magnetic moment, upper pole layer aside from said write head masks.

12. A method in accordance with claim 11 wherein the steps are performed comprising:

said high magnetic moment, upper pole layer (UP) having a narrow width "N", narrowing said write gap layer (WG) to width "N", said high magnetic moment, lower pole layer (S2B) having a width "W" immediately over said low magnetic moment, second magnetic shield layer (S2A), and patterning said high magnetic moment, lower pole layer (S2B) to magnetic pole width "N" in part and flaring the remainder of said high magnetic moment, lower pole layer (S2B) towards said width "W" proximate to said write gap layer (WG).

13. A method in accordance with claim 11 wherein the steps are performed comprising:

sputtering a PLM nickel-iron seed layer (SL) over said read gap layer (RG) prior to plating said low magnetic moment, second magnetic shield layer (S2A), said low magnetic moment, second magnetic shield layer (S2A) over said read gap layer (RG) is formed of a material having soft-magnetic properties selected from the group consisting of NiFe, NiFeCr, NiFeMo, NiFeW, NiFePd, NiFeCu, and NiFeCo, and said high magnetic moment, lower pole layer (S2B) is formed of a material selected from the group of materials having high saturation magnetization consisting of Ni45Fe55, Ni45Fe55Sn, CoNiFe, CoFeCu, Ni45Fe55Cr, and Ni45Fe55Mo.

* * * * *